United States Patent [19]

Kataoka et al.

[11] Patent Number: 4,699,490
[45] Date of Patent: Oct. 13, 1987

[54] DIAPHRAGM CONTROL DEVICE FOR CAMERAS

[75] Inventors: Akira Kataoka, Sennan; Yasuo Hawai, Higashiosaka, both of Japan

[73] Assignee: Minolta Camera Kabushiki Kaisha, Osaka, Japan

[21] Appl. No.: 881,875

[22] Filed: Jul. 3, 1986

[30] Foreign Application Priority Data

Jul. 8, 1985 [JP] Japan .................................. 60-150931

[51] Int. Cl.⁴ .............................................. G03B 9/02
[52] U.S. Cl. .................................................. 354/271.1
[58] Field of Search ...................... 354/272, 271.1, 273, 354/274, 435, 440, 446, 448, 455

[56] References Cited

U.S. PATENT DOCUMENTS 3,987,460 10/1976 Ueda et al. ........................... 354/448
4,075,641 2/1978 Uno et al. ............................. 354/448
4,396,272 8/1983 Shono et al. ......................... 354/455

FOREIGN PATENT DOCUMENTS 53-86209 7/1978 Japan .

Primary Examiner—L. T. Hix
Assistant Examiner—Brian W. Brown
Attorney, Agent, or Firm—Wolder, Gross & Yavner

[57] ABSTRACT

A diaphragm control device for a lens exchangeable type camera includes diaphragm driving means providing a uniform speed over the entire diaphragm control range, so that accurate diaphragm control is achieved even in the vicinity of a fully open aperture value. The start position of the diaphragm drive means is determined such that the diaphragm control member of an exchangeable lens is engaged by a stopper to define a fully open aperture position in the course of return movement of the diaphragm drive means to the start position. A coupling spring coupling the diaphragm drive means with a diaphragm control member of a camera body as an integral unit is deformed to allow separation of the diaphragm drive means from the diaphragm control member of the camera body so that the diaphragm drive means can return to the start position after the engagement of the stopper with the diaphragm control member of the exchangeable lens. The loaded coupling spring serves, in cooperation with a stop-down drive spring, to accelerate the driving movement of the diaphragm driving means sharply, so that the driving speed is substantially uniform after the diaphragm drive means and the diaphragm control member of the camera body are again integrally intercoupled due to depletion of the stored energy of the coupling spring.

10 Claims, 3 Drawing Figures

DIAPHRAGM CONTROL DEVICE FOR CAMERAS

BACKGROUND OF THE INVENTION

1. Field of the Invention

The present invention relates to a diaphragm control device for cameras, which determines the shooting aperture of an exchangeable lens by stopping the operation of a diaphragm actuating mechanism, which causes the diaphragm control member of the exchangeable lens to stop down the diaphragm of the exchangeable lens, when an electric signal representing the amount of operation of the diaphragm actuating mechanism coincides with a preset reference value.

2. Description of the Prior Art

Most of the known diaphragm control devices of the above described type employ an electromagnetic mechanism including an electromagnet for stopping the operation of the diaphragm actuating mechanism provided on a camera body. A diaphragm stop signal to invert the state of the electromagnet upon the coincidence of the electric signal representing the amount of operation of the diaphragm actuating mechanism with a preset reference value is generated by an aperture control circuit. The electromagnetic mechanism stops the diaphragm actuating mechanism mechanically in response to the inversion of the state of the electromagnet. However, there is a certain time lag from the generation of the diaphragm stop signal till the stop of the operation of the diaphragm actuating mechanism by the electromagnetic mechanism, so that the actual diaphragm aperture thus determined will be smaller than an optimum diaphragm aperture if the diaphragm stop signal is generated when the diaphragm actuating mechanism has operated to a position providing an optimum diaphragm aperture, and hence accurate aperture control is impossible. To cope with this problem, a method of advancing the time of generation of the diaphragm stop signal by a fixed time corresponding to the delay of the actuation of the electromagnetic mechanism has been employed. The operating speed of the diaphragm actuating mechanism must be stable over the entire diaphragm control range to always achieve accurate aperture control by this known method. However, since the diaphragm actuating mechanism is accelerated gradually when the diaphragm actuating mechanism is operated by a spring, which is an ordinary measure to operate a conventional diaphragm actuating mechanism, it has been difficult to stabilize the operating speed of the diaphragm actuating mechanism, and accordingly accurate diaphragm control cannot be always expected even by the above method. Especially in the case of diaphragm control devices disclosed in Japanese Patent Laid-open Publication No. 53-86209 and U.S. Pat. No. 4,396,272, the respective starting positions of the diaphragm control member of a diaphragm actuating mechanism and a diaphragm control member of an exchangeable lens interlocked with the former diaphragm control member are defined by stopper means mounted on a camera body or on the exchangeable lens, and the amount of the displacements of the diaphragm control members from the respective starting positions are converted into pulse signals. The exchangeable lens used in the diaphragm control devices need not be provided with a mechanism accepting overloading of the diaphragm control members because their starting positions are defined by the stopper means and hence the exchangeable lens can be constructed in a compact structure. However, since the diaphragm control members are accelerated immediately after the start of the stop-down operation thereof, it is difficult to accurately determine the diaphragm aperture particularly in the vicinity of the starting positions of the diaphragm control members, that is, in the vicinity of a fully open aperture value.

SUMMARY OF THE INVENTION

Accordingly, it is an object of the present invention to provide a diaphragm control device for cameras, which is capable of accurate diaphragm control over the entire diaphragm control range while the cameras employ exchangeable lenses having stopper means as described above.

In a diaphragm control device according to the present invention, a diaphragm actuating mechanism mounted on a camera body comprises a diaphragm control member engageable with the diaphragm control member of an exchangeable lens, and diaphragm driving means adapted to be powered by a stop-down drive spring to drive the diaphragm control member of the camera body. The diaphragm control member of the camera body and the diaphragm driving means are intercoupled by a coupling spring. The amount of the movement of the diaphragm driving means from its starting position is detected by detecting means and converted into an electric signal. To establish the initial state of the diaphragm actuating mechanism, diaphragm control members of the camera body and the exchangeable lens are retained at the respective starting positions corresponding to the fully open position of the diaphragm, respectively, by stopper means, while the diaphragm means is returned to the starting position thereof deforming or loading the coupling spring to store energy. When the diaphragm driving means is released, the driving motion of the diaphragm driving means is accelerated sharply by the force of the coupling spring in addition to the force of the stop-down drive spring and, upon the depletion of the energy of the coupling spring, the diaphragm control member of the camera body is driven to start from the starting position only by the force of the stop-down drive spring so that the diaphragm control member will be moved substantially at a constant speed. Accordingly, the diaphragm driving means drives the diaphragm at a stable driving speed from the start of actual stop-down operation, so that the variation of the electric signal within the time lag from the generation of a diaphragm stop signal till actual determination of the diaphragm aperture by an electromagnetic diaphram control mechanism including an electromagnet remains unchanged over the entire diaphragm control range. Hence accurate diaphragm control is achieved even in the vicinity of the fully open aperture if the device is arranged to count the variation of the electric signal within the time lag as being fixed, in determining the timing of the actuation of the electromagnetic diaphragm control mechanism.

The above and other objects, features and advantages of the present invention will become more apparent from the following description of a preferred embodiment thereof taken in conjunction with the accompanying drawings.

DESCRIPTION OF THE PREFERRED EMBODIMENT

Figure 1:
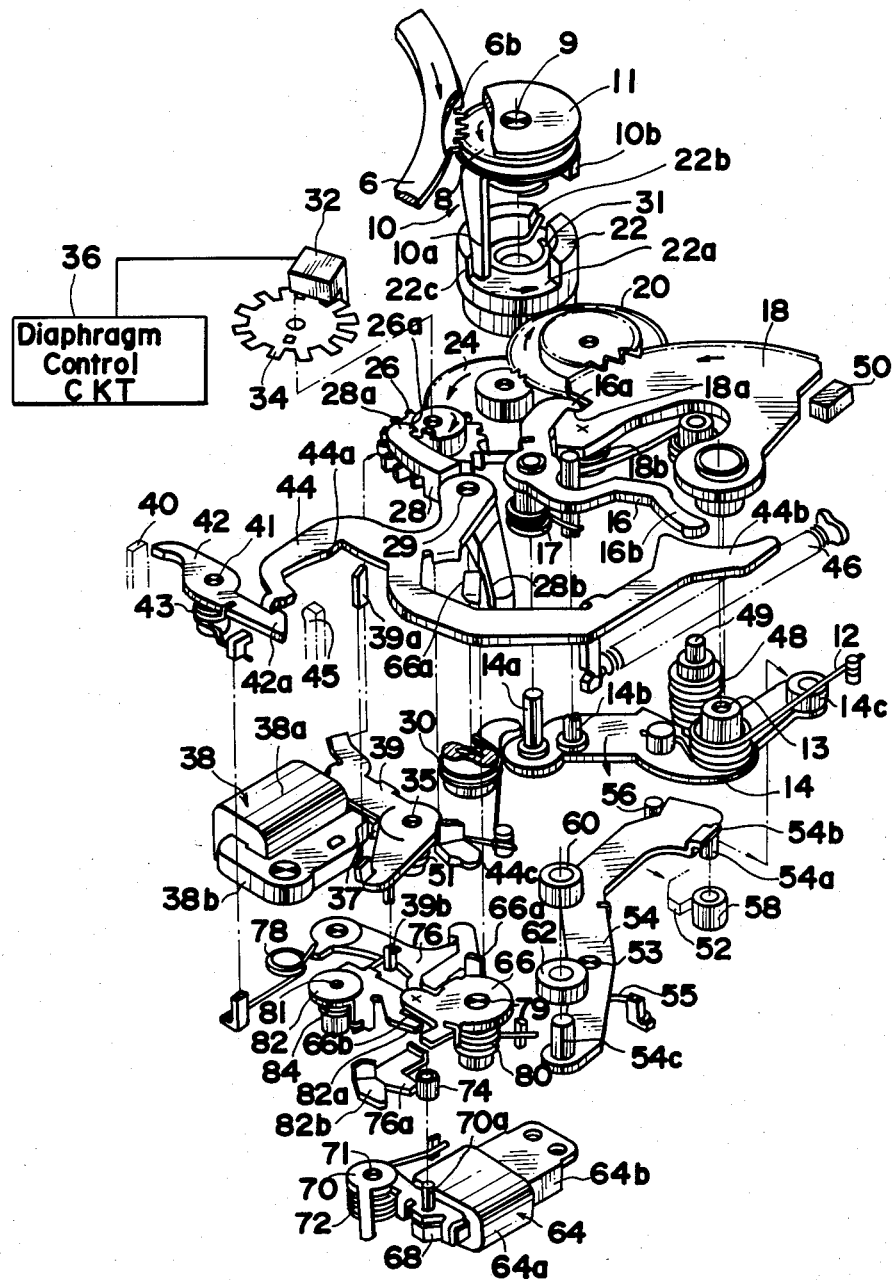
FIG. 1 is an exploded perspective view of an essential portion of a diaphragm control device according to a preferred embodiment of the present invention.
Figure 2:
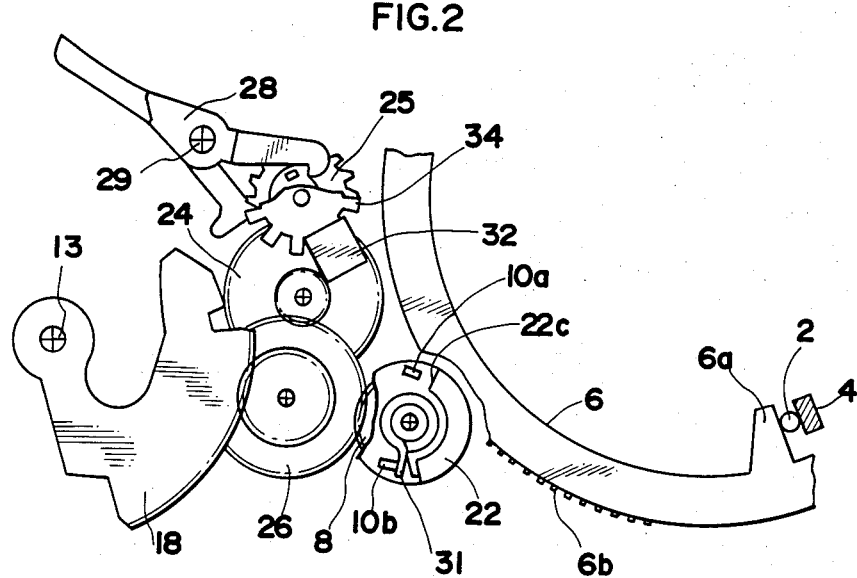
FIG. 2 is a front elevation of the diaphragm control device of FIG. 1, showing the interconnection between the mechanism mounted on an exchangeable lens and the mechanism mounted on a camera body.

Referring to FIGS. 1 and 2 showing a diaphragm control device according to an embodiment of the present invention in a state after the shutter has been cocked, a diaphragm control lever 2 is urged by a spring, not shown, in a direction (leftward as viewed in FIG. 2) to reduce the aperture of a diaphragm, and a diaphragm control lever stopper 4 for limiting the movement of the diaphragm control lever 2 in a direction to increase the aperture of the diaphragm (rightward, as viewed in FIG. 2) to a position corresponding to the full aperture of the diaphragm. The diaphragm control lever 2 and the diaphragm control lever stopper 4 are provided on an exchangeable lens. Since the exchangeable lens is provided with the diaphragm control lever stopper 4, the exchangeable lens is not provided with any mechanism for allowing overloading of the diaphragm control lever 2.

The rest of the members shown in FIGS. 1 and 2 are provided on a camera body. In FIG. 1 and 2, a diaphragm control ring 6 having a projection 6a engaging the diaphragm control lever 2 and an external gear 6b are supported on the camera body so as to be turnable around the opening of a lens mount. A diapharagm control gear 8 engaging the gear 6b is pivotally supported on a shaft 9 and a driven member 10 is secured to the diaphragm control gear 8. The diaphragm control gear 8 and the driven member 10 are retained on the shaft 9 by a stop disk 11. The members 6, 8 and 10 together constitute a diaphragm control member of the camera body.

Members 12, 14, 16, 18, 20, 22, 24 and 26 together constitute a diaphragm driving means. A diaphragm driving spring 12 biases a diaphragm driving lever 14 in a direction to stop down the diaphragm as indicated by an arrow in FIG. 1. The diaphragm driving lever 14 is provided, on the upper surface thereof, with two pins 14a and 14b, and a roller 14c. An interlocking lever 16 is pivotally supported on the pin 14a for engaging a sector gear 18 supported coaxially with the diaphragm driving lever 14 on a shaft 13 with or for disengaging the same from the diaphragm driving lever 14. In the state as shown in FIGS. 1 and 2 after the shutter has been cocked, the interlocking lever 16 is biased by a spring 17 so that a tongue 16a formed on one end thereof engages a recess 18a formed in the sector gear 18 to interlock the sector gear 18 with the diaphragm driving lever 14. The sector gear 18 is engaged with an intermediate gear 20, and the intermediate gear 20 is engaged with a driving gear 22 and an interlocking gear 24. Meanwhile the intermediate gear 20 and the interlocking gear 24 are each a double-gear, respectively, as shown in FIG. 1. A part of the upper surface of the driving gear 22 is cut to form gaps 22a and 22b. The leg 10a of the driven member 10 is located in the gap 22a.

The interlocking gear 24 is engaged with a not shown gear secured to a ratchet wheel 26 to turn the ratchet wheel 26 as the intermediate gear 20 rotates.

A release locking lever 28 having an arm 28a and a cam surface 28b is supported rotatably on a shaft 29 and is urged clockwise, as viewed in FIG. 1, by a spring 30 so as to engage a stepped cam 26a of the ratchet wheel 26 by the arm 28a to hold the diaphragm driving means in the starting position against the biasing force of the diaphragm driving spring 12 and a coupling spring 31, which will be described later. When the ratchet wheel 26 is released from the release locking lever 28, the diaphragm driving lever 14 is driven by the diaphragm driving spring 12 to turn the sector gear 18 in the direction of the arrow. Consequently, the gears 20, 22 and 24 and the ratchet wheel 26 are turned in the direction of the arrows, respectively, and the diaphragm control gear 8 and the diaphragm control ring 6 are turned in the directions of the arrows, respectively, by the driving gear 22 through the leg 10a of the driven member 10 engaging one end wall 22c of the gap 22a.

A coupling spring 31 has one end engaging one end wall of the gap 22b of the driving gear 22 and the other end engaging a projection 10b of the driven member 10. The end wall 22c of the driving gear 22 and the leg 10a of the driven member 10 are kept always in contact with each other by the coupling spring 31. When the driving gear 22 is turned in a direction opposite to the direction of the arrow to restore the diaphragm driving means to its starting position, the driven member 10 is turned by the driving gear 22 by way of the coupling spring 31. When the diaphragm driving means is operated further toward its starting position after the diaphragm control lever 2 of the exchangeable lens has been brought into contact with and stopped by the diaphragm control lever stopper 4 to stop the diaphragm control ring 6 of the camera body, the coupling spring 31 is deformed to allow the further rotation of the diaphragm driving gear 22, so that the driving gear 22 is overloaded.

A photocoupler 32 and a chopper 34 constitutes a detecting head for detecting the magnitude of the driving motion of the diaphragm driving means from the starting position. The chopper 34 is secured coaxially with the ratchet wheel 26 and has a plurality of recesses formed in the circumference thereof at regular angular intervals. As the diaphragm driving motion of the diaphragm driving means proceeds, the photocoupler 32 provides pulses, the number of which corresponds to the magnitude of the driving motion of the diaphragm driving means from the starting position. The pulses are given to a known diaphragm control circuit 36. As is generally known, the diaphragm control circuit 36 compares the number of pulses with a predetermined reference value and generates a diaphragm stop signal to de-energize a diaphragm control magnet 38 when a given relationship is established between the number of the pulses and the reference value. The diaphragm control magnet 38 is provided with a solenoid 38a and a fixed core 38b. When the solenoid 38a is energized during shutter releasing operation, an armature 37 is attracted to and held on the core 38b. The armature 37 is attached to a diaphragm locking lever 39 rotatably supported on a shaft 35. When the armature 37 is attracted to the core 38b, the diaphragm locking lever 39 is retained against the resilient force of a spring 51 at a position shown in FIG. 1. When the diaphragm stop signal is provided to de-energize the solenoid 38a so that the attraction of the electromagnet 38 is extinguished, the diaphragm locking lever 39 is turned clockwise by the spring 51, and thereby engages the teeth of the ratchet wheel 26 by a finger 39a to lock the ratchet wheel 26. Consequently, the rotation of the members constituting the diaphragm driving means in the directions of the arrows is interrupted to stop the stop-down operation of the diaphragm control member of the camera body constituted by the members 6, 8 and 10 and the diaphragm control member 2 of the exchangeable lens, so that the diaphragm is set at an appropriate aperture. Incidentally, this constitution has a fixed time lag between the generation of a diaphragm stop signal by the diaphragm control circuit 36 and actual determination of the diaphragm aperture, caused mainly by a time lag between the release of the diaphragm locking lever 39 from the diaphragm control magnet 38 and the locking of the ratchet wheel 26. Therefore, it would be impossible to achieve accurate diaphragm control if the diaphragm control circuit 36 were designed so as to generate a diaphragm stop signal when the diaphragm is stopped down actually to an aperture corresponding to a predetermined reference value. Accordingly, the diaphragm control circuit 36 is designed so as to generate a diaphragm stop signal in advance of the actual stop-down of the diaphragm to an aperture corresponding to a predetermined reference value by a period of time equal to the fixed time lag between the generation of a diaphragm stop signal and actual determination of the diaphragm aperture. More specifically, the quantity of rotation of the ratchet wheel 26, hence, the number of pulses to be generated by the photocoupler 32, in the fixed time lag can be estimated, so that the diaphragm control circuit 36 can be designed so as to generate a diaphragm stop signal when the sum of the number of pulses N provided after the start of the diaphragm driving means from the starting position and the number of pulses $N_0$ corresponding to the fixed time lag coincides with a predetermined reference value.

Members 40, 42, 44, 46 and 48 constitute a returning mechanism. An exposure completion signaling member 40 is moved to the right as viewed in FIG. 1 upon completion of running of a shutter trailing curtain, not shown. The exposure completion signaling member 40 is returned to a position shown in FIG. 1 by shutter cocking operation. Indicated at 42 is a locking lever, at 44 is a return driving lever and at 46 is a return driving spring. The locking lever 42 locks the return driving lever 44 against the biasing force of the return driving spring 46. The locking lever is supported rotatably on a shaft 41 and is biased counterclockwise by a spring 43 so that the tongue 42a thereof engages one end of the return driving lever 44. When moved to the right, the exposure completion signaling member 40 pushes the locking lever 42 at one end thereof to turn the same clockwise, and thereby the return driving lever 44 is released. The return driving lever 44 is supported rotatably on the shaft 29 and has cam surfaces 44a and 44b and a finger 44c formed at the lower end of a downward arm thereof. When released from the locking lever 42, the return driving lever 44 is turned counterclockwise by the force of the return driving spring 46, then the cam surface 44a engages the finger 39a of the diaphragm locking lever 39 to turn the diaphragm locking lever 39 counterclockwise so that the ratchet wheel 26 is released from the finger 39a, while one end thereof pushes a film wind-up lock releasing lever 45 to allow wind-up of the film for the next exposure. On the other hand, the cam surface 44b engages the arm 16b of the interlocking lever 16 to turn the interlocking lever 16 counterclockwise so that the tongue 16a thereof is moved away from the recess 18a of the sector gear 18. A diaphragm driving means returning spring 48 wound around a shaft 49 has one end engaging a projection 18b projecting downward from the lower surface of the sector gear 18, and the other end engaging the diaphragm driving lever 14. The diaphragm driving means returning spring 48 stores torsional energy for biasing the diaphragm driving lever 14 counterclockwise and the sector gear 18 clockwise. Accordingly, when the sector gear 18 is released from the interlocking lever 16, the sector gear 18 is turned in a direction opposite to the direction of the arrow by the diaphragm driving means returning spring 48, and thereby the members constituting the diaphragm driving means are rotated in directions opposite the directions of the arrows, respectively, while the diaphragm driving lever 14 is turned also by the diaphragm driving means returning spring 48 in the direction of the arrow to a final position where the diaphragm driving lever 14 is stopped by a stopper, not shown. At this moment, the diaphragm control lever 2 of the exchangeable lens is stopped by the diaphragm control lever stopper 4, and thereby the returning motion of the diaphragm control member constituted by the members 6, 8 and 10 of the camera body is terminated to complete the return motion of the diaphragm driving means.

A film wind-up and shutter cocking mechanism includes members 52 and 54. A reciprocating member 52 is moved in the direction of the arrow by film wind-up and shutter cocking operation and is allowed to return to the original position upon the completion of the film wind-up and shutter cocking operation. A shutter cocking lever 54 supported rotatably on a shaft 53 is biased counterclockwise and held in contact with a stopper 56 by a spring 55. The shutter cocking lever 54 is provided with a pin 54a supporting a roller 58 engaging the reciprocating member 52, a bent portion engaging the roller 14c of the diaphragm driving lever 14, and a pin 54c supporting rollers 60 and 62. When the roller 58 is pushed in the direction of the arrow by the reciprocating member 52, the shutter cocking lever 54 is turned clockwise turning the return driving lever 44 clockwise by the engagement of the roller 60 with the tongue 44c of the return driving lever 44 to return the return driving lever 44 to its starting position and to store energy in the return driving spring 46. While the diaphragm driving lever 14 is turned in a direction opposite to the direction of the arrow, the interlocking lever 16 is moved with the tongue 16a thereof held in contact with the periphery of the sector gear 18 by the spring 17, and the tongue 16a engages the recess 18a. As the shutter cocking lever 54 is turned clockwise further, the shutter cocking lever 54 turns the sector gear 18 further in a direction opposite the direction of the arrow. Consequently, the members constituting the diaphragm driving means are turned further in the directions opposite the directions of the arrows, respectively. On the other hand, since the diaphragm control member constituted by the members 6, 8 and 10 is checked through the diaphragm control lever 2 by the diaphragm control lever stopper 4, the coupling spring 31 is distorted to allow overloading of the driving gear 22. In FIG. 1, indicated at 50 is a stopper for preventing the reverse turning of the sector gear 18 beyond a final position.

When the shutter cocking lever 54 is turned clockwise, the roller 62 pushes a release trigger lever 66 which is controlled by a release magnet 64. A release mechanism including the release magnet 64 will be described hereinafter. The release magnet 64 is provided with a solenoid 64a and a fixed core 64b. The solenoid 64a is energized in response to a release operation. An armature lever 70 having an armature 68 to be attracted to the fixed core 64b is supported rotatably on a shaft 71 and is biased clockwise by a spring 72. A pin 70a supporting a collar 74 is attached to the armature lever 70. A locking lever 76 having a bent portion 76a engaging the collar 74 is supported on a shaft and is biased counterclockwise by a spring 78 to lock the release trigger lever 66. When the solenoid 64a is energized, the attraction of a permanent magnet, not shown, working on the armature 68 is balanced. Consequently, the armature lever 70 is turned clockwise by the spring 72 to push the bent portion 76a of the locking lever 76 by the collar 74, and thereby the locking lever 76 is turned clockwise to release the release trigger lever 66. Then, the release trigger lever 66, when released, is turned clockwise about the shaft 79 by the spring 80 to turn the release locking lever 28 counterclockwise by an upright arm 66a to release the ratchet wheel 26, hence the diaphragm driving means, from the release locking lever 28. A pin 66b provided on the lower surface of the release trigger lever 66 is fitted in the forked portion 82a of a pressing lever 82. One end of a spring 84 having the other end engaging a pin 39b provided on the lower surface of the diaphragm locking lever 39 engages the pressing lever 82. In the state shown in FIG. 1, in which the shutter is cocked, the spring 84 presses the armature 37 attached to the diaphragm locking lever 39 against the core 38b of the diaphragm control magnet 38. When the release trigger lever 66 is turned clockwise as mentioned above, the pressing lever 82 is turned counterclockwise by the pin 66b and the force of the spring 84 urging the diaphragm locking lever 39 in the counterclockwise direction dies away. However, since the solenoid 38a of the diaphragm control 38 is kept energized after the shutter releasing operation, the armature 37 is kept attracted to the core 38b until the diaphragm control circuit 36 provides a diaphragm stop signal. The bent portion 82b of the pressing lever 82 pushes the collar 74 as the pressing lever 82 is turned counterclockwise, and thereby the armature lever 70 is turned counterclockwise, and then the armature 68 is attracted again to the core 64b of the release magnet 64 by the attraction of the permanent magnet. Clockwise turning of the shutter cocking lever 54 causes the release trigger lever 66, which has turned clockwise, to turn counterclockwise. Consequently, the release trigger lever 66 is locked again by the locking lever 76, while the pressing lever 82 is turned clockwise with the pin 66b. When the pressing lever 82 is turned clockwise, the bent portion 82b is separated from the collar 74 to allow the clockwise turning of the armature lever 70, while the spring 84 pushes the pin 39b of the diaphragm locking lever 39 which is separated from the gear 26, to press the armature 37 attached to the diaphragm locking lever 39 again to the core 38b of the diaphragm control magnet 38.

The functioning of the embodiment thus constituted will be described hereinafter. When a shutter releasing operation is carried out with the mechanisms set in the state showing in FIGS. 1 and 2, the solenoid 64a is energized to allow the armature lever 70 to turn clockwise, and thereby the release trigger lever 66 is released from the locking lever 76. Then, the release trigger lever 66 is turned clockwise to turn the armature lever 70 counterclockwise through the pressing lever 82 and releases the ratchet wheel 26 from the release locking lever 28, so that the diaphragm driving means starts the driving operation. The process of the driving operation is divided into a preliminary driving stage for the preliminary rotation of the diaphragm driving means, in which the driving gear 22 is rotated until the end wall 22c of the gap 22a thereof comes into contact with the leg 10a of the driven member 10, and an actual driving stage following the preliminary driving stage. In the preliminary driving stage, the diaphragm driving means is powered by the coupling spring 31 in addition to the diaphragm driving spring 12. Accordingly, the driving motion of the diaphragm driving means is accelerated at a high rate to complete the acceleration within the preliminary driving stage as indicated by a solid line in FIG. 3. After the end of the preliminary driving stage, the diaphragm driving means is powered only by the diaphragm driving spring 12 so that the drive of the diaphragm driving means will be effected substantially at a constant speed. After the engagement of the end wall 22c of the gap 22a of the driving gear 22 with the leg 10a of the driven member 10, the diaphragm control member constituted by the members 6, 8 and 10 of the camera body starts rotating in the direction of the arrow and the diaphragm control lever 2 of the exchangeable lens is made to follow the rotation of the diaphragm control member by the stop-down spring provided in the exchangeable lens (not shown), for stopping down the diaphragm. On the other hand, simultaneously with the start of the preliminary driving motion of the diaphragm driving means, the chopper 34 secured to the ratchet wheel 26 starts rotating, and thereby the photocoupler 32 generates pulses of a count corresponding to the quantity of driving motion of the diaphragm driving means. The diaphragm control circuit 36 provides a diaphragm stop signal when the sum of the number of pulses N provided after the start of the diaphragm driving means from the starting position and the number of pulses $N_0$ corresponding to the time lag described earlier coincides with a predetermined reference value. Then, the solenoid 38a of the diaphragm control magnet 38 is de-energized in response to the diaphragm stop signal. Consequently, the diaphragm locking lever 39 is turned clockwise and the finger 39a engages the ratchet wheel 26 to stop the stop-down operation of the diaphragm driving means and the diaphragm control member (members 6, 8 and 10) connected to the diaphragm driving means by the agency of the coupling spring 31. Thus, the diaphragm control lever 2 of the exchangeable lens is stopped to set the diaphragm aperture.

Figure 3:
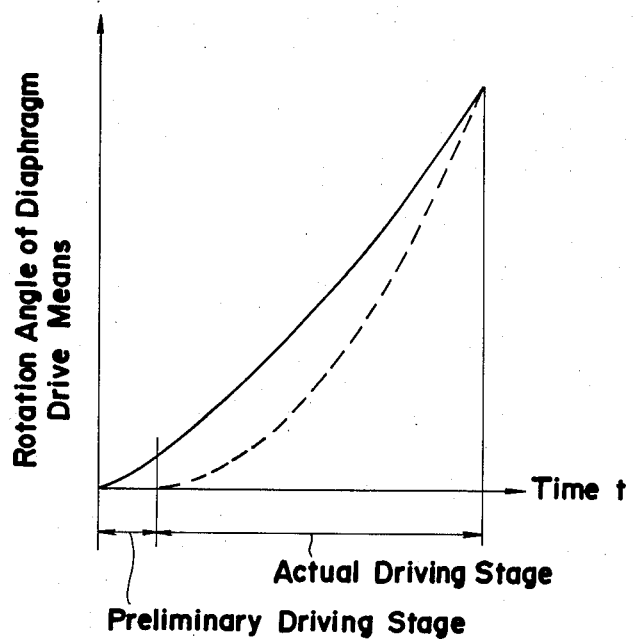
FIG. 3 is a graph showing the stop-down characteristics of the diaphragm control device of FIG. 1.

In setting the diaphragm aperture, the driving speed of the diaphragm driving means is rendered substantially constant from the beginning to the end of the actual diaphragm stop-down operation as indicated by the solid line in FIG. 3. Accordingly, the diaphragm can be accurately set to the aperture exactly corresponding to the reference value over the entire diaphragm control range from the maximum aperture to the minimum aperture, even if the number $N_0$ of pulses corresponding to the time lag is fixed. Furthermore, since the coupling spring 31 serves to keep the tooth faces of the meshing gears of the diaphragm driving means in contact with each other prior to the preliminary driving operation in the same state as that in the actual driving operation, there is no possibility that an error attributable to the backlashes between the tooth faces of the meshing gears is included in the number of pulses produced by the photocoupler 32. The stop-down characteristics of the conventional diaphragm control devices disclosed in the above-mentioned Japanese Patent Laid-Open Publication No. 53-86209 and U.S. Pat. No. 4,396,272 are shown in FIG. 3 for comparison by a broken line.

After the diaphragm aperture has been thus set, the shutter is actuated to complete the exposure operation. Then, the exposure completion signaling member 40 is moved to the to release the return driving lever 44 from the locking lever 42. Then, the return driving lever 44 is turned counterclockwise by the return driving spring 46 to push the finger 39a with the cam surface 44a in order to release the ratchet wheel 26 from the diaphragm locking lever 39, and to push the film wind-up lock releasing lever 45 by one end thereof to allow film wind-up for the next exposure. As the return driving lever 44 is turned counterclockwise, the cam surface 44 engages the arm 16b of the interlocking lever 16 to turn the interlocking lever 16 counterclockwise about the pin 14a, and thereby to move the tongue 16a away from the recess 18a, so that the sector gear 18 is disconnected from the diaphragm driving lever 14. Then, the diaphragm driving lever 14 is turned by the spring 48 in the direction of the arrow until the diaphragm driving lever 14 is stopped by a stopper, not shown, at the final position thereof, while the sector gear 18 is turned also by the spring 48 in a direction opposite the direction of the arrow. The rotation of the sector gear 18 causes the intermediate gear 20, the driving gear 22, the interlocking gear 24 and the ratchet wheel 26 in the directions opposite the directions of the arrows, respectively, and thereby the diaphragm control member constituted by the members 6, 8 and 10 is rotated in a direction opposite the direction of the arrow. During the reverse rotation of the sector gear 18, the projection 6a of the diaphragm control ring 6 of the exchangeable lens pushes the diaphragm control lever 2 rightward, as viewed in FIG. 2, to open the stopped-down diaphragm. When the diaphragm is opened to the maximum aperture, the diaphragm control lever 2 is stopped by the diaphragm control lever stopper 4 to forbid the further movement of the diaphragm control lever 2. Consequently, the returning rotation of the diaphragm control member constituted by the members 6, 8 and 10 of the camera body, hence, the returning rotation of the sector gear 18, the intermediate gear 20, the driving gear 22, the interlocking gear 24 and the ratchet wheel 26 of the diaphragm driving means is stopped.

Thereafter, the film is wound for the next exposure manually or automatically by means of a motor. Then, the reciprocating lever 52 is moved in the direction of the arrow to turn the shutter cocking lever 54 clockwise. Consequently, first the roller 60 turns the return driving lever 44 clockwise. By this time, the exposure completion signaling member 40 has been retracted to a position shown in FIG. 1. Accordingly, the return driving lever 44 turned in the clockwise direction is locked again by the locking lever 42. The clockwise rotation of the return driving lever 44 releases the interlocking lever 16, so that the interlocking lever 16 is brought into contact with the periphery of the sector gear 18 by the spring 17. On the other hand, the diaphragm driving lever 14 is turned clockwise as the shutter cocking lever 54 is turned clockwise, and thereby the tongue 16a of the interlocking lever 16 drops into the recess 18a of the sector gear 18 to interlock the sector gear 18 with the diaphragm driving lever 14. The shutter cocking lever 54 is turned further clockwise turning the diaphragm driving lever 14 to make the pin 14b push the sector gear 18. Consequently, the interlocking gear 24 is turned further in the direction opposite to the direction of the arrow, and thereby the end wall 22c is separated from the leg 10a of the driven member 10, which has been restrained from rotation to distort coupling spring 31 and to allow overloading of the diaphragm drive means. The overloading of the diaphragm driving means is terminated upon abutment of the sector gear 18 against the stopper 50. On the other hand, as the shutter cocking lever 54 is turned clockwise, the roller 62 turns the release trigger lever 66 counterclockwise, so that the release trigger lever 66 is locked by the locking lever 76. As the release trigger lever 66 is turned counterclockwise, the pressing lever 82 is turned clockwise by the pin 66a, and thereby the bent portion 82b is separated from the collar 74, so that the armature lever 70 is allowed again to turn clockwise, while the spring 84 pushes the pin 39b to turn the diaphragm locking lever 39 counterclockwise until the armature 37 is pressed against the core 38b of the diaphragm control magnet 38. After the completion of a series of the return motions, the film winding operation and the shutter cocking operation, the reciprocating member 52 moves in the direction opposite the direction of the arrow to the original position. Thus, the state shown in FIG. 1, in which the shutter is in the cocked condition and the diaphragm control device is at the starting position, is established.

Although the invention has been described in connection with a preferred embodiment, the detailed construction and configuration of the diaphragm control device shown in the accompanying drawings are for illustrative purpose only and accordingly it is to be understood that various changes and modifications may be readily made without departing from the spirit of the invention. For example, the stopper 4 may be provided on the camera body to engage one of the members 6, 8 and 10, so that it can define a fully open aperture position of the diaphragm control member of the camera body constituted by the members 6, 8 and 10. In addition, the photocoupler 32 and the chopper 34 may be replaced with a potentiometer.

Meanwhile, the reference value with which the sum of the number of pulses N provided after the start of the diaphragm drive means from the starting position and the number of pulses $N_0$ corresponding to the time lag described earlier is compared is set automatically or manually. More particularly, an aperture value difference between an optimum aperture value Av and a fully open aperture value Avo is detected by T.T.L (through-the-lens) light measurement with the diaphragm held at a fully open aperture or an aperture value difference between a set aperture value and the fully open aperture value is obtained by manual aperture setting. The reference value is such an aperture value difference converted into the corresponding number of pulses and subtracted by the number of pulses corresponding to the amount of the preliminary driving operation of the diaphragm drive means. However, in case the number of pulses N corresponding to the time lag described earlier is to be counted into the reference value, the number $N_0$ is added to the aperture value difference converted into the corresponding number of pulses and subtracted by the number of pulses corresponding to the preliminary driving operation of the diaphragm drive means and the diaphragm control circuit is designed so as to generate a diaphragm stop signal when the number of pulses N provided after the start of the diaphragm drive means from the starting position coincides with the reference value.

What is claimed is:

1. A diaphragm control device for a camera which employs an exchangeable lens detachably mounted on a camera body and including a first diaphragm control member biased to stop-down the lens diaphragm said device comprising:

a diaphragm actuating mechanism arranged in said camera body for moving said first diaphragm control member to stop-down the diaphragm and including:

a second diaphragm control member movable with said first diaphragm control member, said first diaphragm control member following the movement of said second diaphragm control member in the direction to stop-down the diaphragm while being pushed by said second diaphragm control member upon return movement thereof in the direction to open the diaphragm;

diaphragm drive means movable from a start position for driving said first and second diaphragm control members in the stop-down direction;

a coupling spring intercoupling said diaphragm drive means and said second diaphragm control member; and a drive spring having the energy to move said diaphragm drive means for causing the movement of said first and second diaphragm control members in the stop-down direction;

detecting means for detecting the amount of movement of said diaphragm drive means from the start position to produce a corresponding electrical signal;

diaphragm determining means including an electromagnet for stopping the movement of said diaphragm drive means when said electrical signal reaches a reference value;

stopper means for engaging one of said first and second diaphragm control members to define a fully open aperture position thereof and preventing the return movement of said first and second diaphragm control members beyond the fully open aperture position; and returning means for returning said drive means to the start position to thereby cause the return movement of said first and second diaphragm control members in the direction to open the diaphragm;

wherein the start position of said diaphragm drive means is determined such that said first and second diaphragm control members are limited by said stopper means in the course of the return movement of said diaphragm drive means to the start position, and said coupling spring is deformed to allow separation of said diaphragm drive means from said second diaphragm control member so that said diaphragm drive means can return to the start position after the engagement of said stopper means with one of said first and second diaphragm control members while said coupling spring stores, due to the deformation, an energy which serves, in cooperation with the energy of said drive spring, to accelerate the movement of said disphragm drive means sharply from the start position, so that the speed of the movement becomes substantially stable after said diaphragm drive means and said second diaphragm control member are made integral with one another again due to depletion of the deformation of said coupling spring.

2. A diaphragm control device as defined in claim 1, wherein said stopper means is arranged in said exchangeable lens so as to be engageable with said first diaphragm control member.

3. A diaphragm control device as defined in claim 2, further comprising:

locking means for releasably locking said diaphragm drive means in the start position; and releasing means for releasing said diaphragm drive means from the locking by said locking means.

4. In a camera comprising a camera body, an interchangeable lens separably mounted on said camera body and including a variable aperture diaphragm movable between a retracted and an advanced position, a first generator producing a first signal responsive to the value of said aperture, a second generator producing a second signal responsive to at least one photographic parameter, a drive mechanism having an output coupled to said diaphragm and movable from a retracted to an advanced position to correspondingly advance said diaphragm, means for locking said drive mechanism in its output retracted position, means for releasing said drive mechanism locking means, means responsive to a predetermined relationship between said first and second signals for stopping said drive mechanism following the release thereof and means for retracting said diaphragm and drive mechanism, the improvement wherein said drive mechanism comprises a pair of first and second springs coupled to the drive mechanism output and loaded in the drive mechanism retracted position, said first and second springs being dimensioned and related whereby upon release of the retracted drive mechanism the drive mechanism output and the lens diaphragm are initially advanced at a high acceleration to a predetermined rate of advance under the influence of said first spring and are maintained following said initial advance at said predetermined rate, by said second spring for the remainder of their advance.

5. The camera of claim 4 wherein the drive mechanism output and the lens diaphragm are accelerated during their initial advance by said first and second springs.

6. The camera of claim 4 wherein said second spring is drive coupled to said drive mechanism output through said first spring.

7. The camera of claim 4 wherein the retracted position of said diaphragm is its fully open aperture position.

8. The camera of claim 4 including stop means limiting the retraction of said diaphragm and drive mechanism to a predetermined position.

9. The camera of claim 4 comprising a diaphragm control member integrally movable with said diaphragm and biased toward an advanced position to follow said drive mechanism output.

10. The camera of claim 4 including a stop located in said lens in the path and retracted position of said diaphragm control member.

* * * * *